(12) United States Patent
Groves et al.

(10) Patent No.: US 6,485,247 B1
(45) Date of Patent: Nov. 26, 2002

(54) ENGINE UPLIFT LOADER

(75) Inventors: Oliver J. Groves, Freeland, WA (US); Marcus Titus Wojcik, Kenmore, WA (US); Thanh V. Duong, Renton, WA (US)

(73) Assignee: The Boeing Company, Seattle, WA (US)

( * ) Notice: Subject to any disclaimer, the term of this patent is extended or adjusted under 35 U.S.C. 154(b) by 22 days.

(21) Appl. No.: 09/672,477

(22) Filed: Sep. 28, 2000

(51) Int. Cl.$^7$ .................................................. B66F 1/00
(52) U.S. Cl. ....................................... 414/589; 180/125
(58) Field of Search ................................ 414/589, 590, 414/458, 461; 180/125, 119; 280/763.1, 766.1; 212/324, 326, 327, 901

(56) References Cited

U.S. PATENT DOCUMENTS

| | | | |
|---|---|---|---|
| 2,815,184 A | 12/1957 | Westphal et al. | |
| 2,896,909 A | 7/1959 | Taylor | |
| 2,931,519 A | 4/1960 | Beach | |
| 2,940,769 A | 6/1960 | Taylor | |
| 3,135,398 A | 6/1964 | Larsen | |
| 3,268,093 A | 8/1966 | Keiter | |
| 3,524,556 A | 8/1970 | Miller | |
| 4,279,565 A | * 7/1981 | Verdy | 414/461 X |
| 4,412,774 A | 11/1983 | Legrand et al. | |
| 4,440,265 A | 4/1984 | Spagnoli | |
| 4,461,455 A | 7/1984 | Mills et al. | |
| 4,522,548 A | * 6/1985 | Oswald et al. | 414/589 X |
| 4,649,581 A | * 3/1987 | Lee, Jr. | 414/458 X |
| 4,660,796 A | 4/1987 | Garrec | |
| 4,861,218 A | * 8/1989 | Lamer | 414/461 |
| 5,087,280 A | * 2/1992 | Fuchigami | 180/119 X |
| 5,575,607 A | * 11/1996 | Grout et al. | 414/589 |

\* cited by examiner

*Primary Examiner*—Donald W. Underwood
(74) *Attorney, Agent, or Firm*—Alston & Bird LLP

(57) ABSTRACT

An engine uplift loader includes a frame assembly having generally parallel first and second frame members spaced apart by a distance enabling the shipping cradle and engine to be positioned between the first and second frame members. A plurality of lifting devices are supported on the frame assembly extending upwardly therefrom, each lifting device being operable to raise and lower an upper end of the lifting device relative to the frame assembly along a generally vertical lifting axis. An attachment assembly is mounted to the upper end of each lifting device, each attachment assembly being structured and arranged to attach to the shipping cradle such that raising the upper ends of the lifting devices causes the shipping cradle and engine to be lifted upwardly. At least one of the attachment assemblies is movably mounted on the respective lifting device such that the attachment assembly can be selectively positioned in various positions relative to the lifting axis of the lifting device so as to accommodate different configurations of shipping cradles. Thus, the engine can be lifted while still in its shipping cradle, and the engine uplift loader can accommodate more than one configuration of engine and cradle.

9 Claims, 7 Drawing Sheets

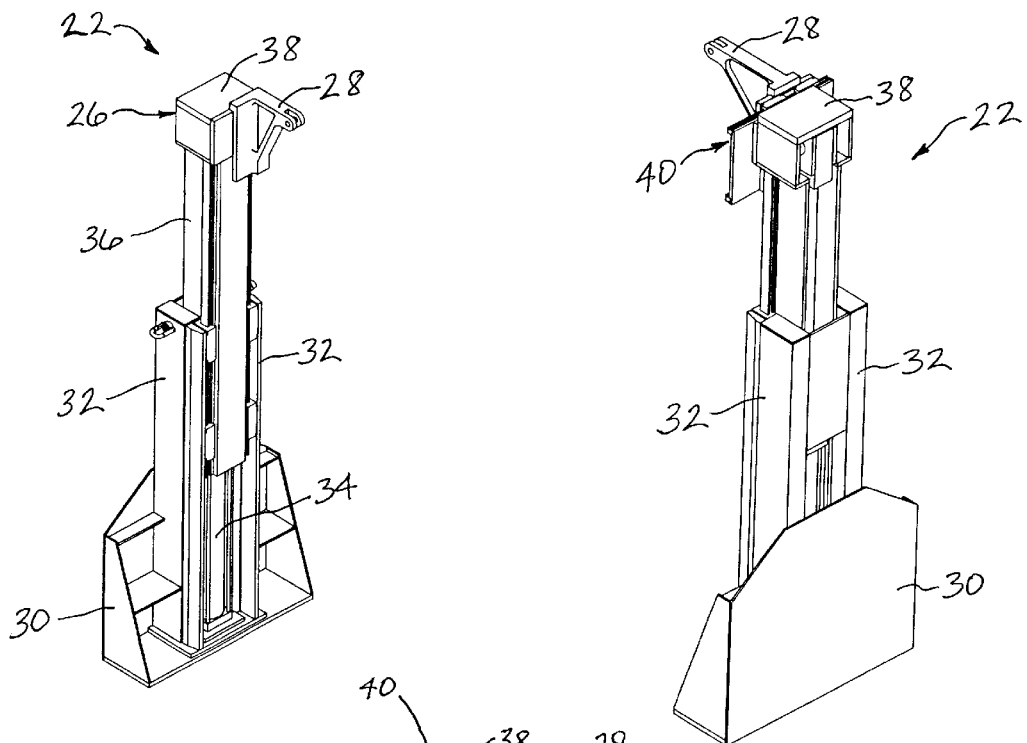
FIG. 5
FIG. 6
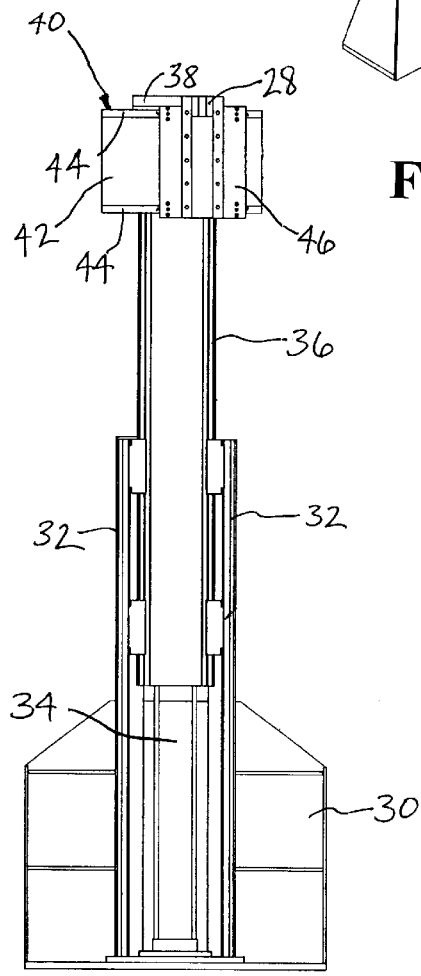
FIG. 7

ENGINE UPLIFT LOADER

FIELD OF INVENTION

The present invention relates to devices for lifting relatively large and heavy structures. The invention relates more particularly to a lifting device for lifting an aircraft engine so that the engine can be attached to engine mounting structure on an aircraft.

BACKGROUND OF THE INVENTION

During installation of an aircraft engine on an aircraft wing, the engine must be lifted up to the wing for mounting the engine on a strut attached to the wing. Where the aircraft wing has dihedral, the engine generally must be rotated about its axis to properly align it with the dowel pins that project downwardly from the strut and that are received into holes in the engine mounts on the engine for supporting shear loads between the engine and the strut. Then, the aircraft engine can be secured to the wing with appropriately sized threaded fasteners that support the tension loads between the engine and the strut.

This installation process is complex, requires close coordination between operators, and can present potential hazards to the loading equipment, the aircraft, the engine, and the operators. Aircraft engines are extremely heavy and present high loading factors during installation. For example, engines for jumbo aircraft, such as the Boeing 777 series aircraft, can weigh in excess of 20,000 pounds. Further, the wings of jumbo aircraft, such as the Boeing 777 series aircraft, can be a considerable height above the ground. Thus, mounting an engine on a jumbo aircraft, such as a Boeing 777 series aircraft, entails lifting an aircraft engine weighing up to 20,000 pounds or more to a strut that can be up to 15 feet off the ground.

Because of the size and weight of aircraft engines for jumbo aircraft, the aircraft engine should be handled as little as possible in order to minimize the likelihood of equipment damage or injuries to personnel. However, installing an aircraft engine using known techniques requires removing the aircraft engine from the aircraft engine's shipping cradle. These known techniques include the use of overhead bridge cranes with slings, a "bootstrap" system that is temporarily mounted on the aircraft wing, and known loaders such as those described in U.S. Pat. Nos. 4,440,265 and 4,461,455. The extra step of transferring the aircraft engine from its shipping cradle necessitated by the use of these known loading methods requires extra tooling and makes these known methods time consuming and expensive. It would be desirable to provide an engine loader that could obviate the necessity of removing the engine from its shipping cradle prior to lifting it to the aircraft.

Further, known loaders such as those described above can only be used to lift the particular aircraft engine they are designed to lift, and cannot accommodate any other aircraft engines. Thus, loading multiple types of aircraft engines with known loaders requires multiple types of loaders. This significantly increases the costs of procuring and maintaining the loading equipment.

Thus, there is an unmet need in the art for an aircraft engine loader that can be used to lift an aircraft engine that is still in the aircraft engine's shipping cradle or to lift a cradle and dolly for an engine, and for an aircraft engine loader that can be used to load multiple types of aircraft engines.

SUMMARY OF THE INVENTION

The present invention addresses the above needs by providing an engine uplift loader that can lift an aircraft engine while still in its shipping cradle for mounting the engine to engine mounting structure on an aircraft. Further, the loader in accordance with a preferred embodiment of the invention can be used for loading different types of engines.

According to one aspect of the invention, an engine uplift loader includes a frame assembly having generally parallel first and second frame members spaced apart by a distance enabling the shipping cradle and engine to be positioned between the first and second frame members. A plurality of lifting devices are supported on the frame assembly extending upwardly therefrom, each lifting device being operable to raise and lower an upper end of the lifting device relative to the frame assembly along a generally vertical lifting axis. An attachment assembly is mounted to the upper end of each lifting device, each attachment assembly being structured and arranged to attach to the shipping cradle such that raising the upper ends of the lifting devices causes the shipping cradle and engine to be lifted upwardly. At least one of the attachment assemblies is movably mounted on the respective lifting device such that the attachment assembly can be selectively positioned in various positions relative to the lifting axis of the lifting device so as to accommodate different configurations of shipping cradles. Thus, the engine can be lifted while still in its shipping cradle, and the engine uplift loader can accommodate more than one configuration of engine and cradle.

Preferably, the lifting devices include attachment fittings mounted adjacent to the upper ends of the lifting devices, and the attachment assemblies include cable assemblies that are removably attached to the attachment fittings. The cable assemblies removably attach the aircraft engine shipping cradle to the loader and are arranged to permit attachment to shipping cradles of different types of aircraft engines. A load monitoring device can be attached to each cable assembly for monitoring the load exerted on the engine and shipping cradle by the engine uplift loader.

The attachment fittings that are movably mounted on their lifting devices preferably are mounted by a slide assembly structured and arranged to permit the attachment assembly to be slid along a horizontal axis. Preferably, each of the first and second frame members supports two spaced-apart lifting devices, and the slide assembly is employed on only one of the two lifting devices for adjusting the distance between the attachment assemblies on the two lifting devices.

According to another aspect of the invention, the frame assembly includes a plurality of fluid cushion bearings that depend downwardly from the frame assembly. The fluid cushion bearings permit the loader to be supported on a fluid film so that it can be readily maneuvered to align the engine with the engine mounting structure on the aircraft.

The engine uplift loader can include a plurality of jacks attached to the frame assembly and operable to be extended in engagement with the supporting surface to urge the engine uplift loader upwardly to maintain a preload between the engine and the engine mounting structure on the aircraft. The loader can also include wheels for transporting the loader along the supporting surface.

In accordance with another aspect of the invention, the frame assembly of the loader comprises a generally U-shaped frame assembly having spaced, generally parallel first and second frame members each having a first end and a second end, and a third frame member extending between the first ends of the first and second frame members. The frame assembly defines an opening between the second ends of the first and second frame members through which the engine on the shipping cradle can be received such that the engine and shipping cradle are disposed between the first and second frame members. Each of the first and second frame members includes a pair of lifting devices spaced apart therealong. Where it is desired to be able to vary the distance between the attachment assemblies that attach to the shipping cradle so as to accommodate different types of engines and cradles, one of the lifting devices on each frame member can include a slide assembly or other type of movable mount for the attachment assembly, as previously described.

The lifting devices preferably comprise fluid-operated cylinders such as hydraulic cylinders, and the cylinders preferably incorporate relief valves for relieving fluid pressure in the cylinders should such pressure exceed a predetermined value. Accordingly, the engine uplift loader is self-relieving to prevent damage to the loader and/or to the aircraft as a result of abnormally large forces therebetween that could arise from various causes.

BRIEF DESCRIPTION OF THE DRAWINGS

FIG. 5 is a perspective view of one of the forward lifting devices for the engine uplift loader;

FIG. 6 is a perspective view of one of the aft lifting devices for the engine uplift loader;

FIG. 7 is a front elevation of the aft lifting device of FIG. 6;

DETAILED DESCRIPTION OF A PREFERRED EMBODIMENT

Figure 1:
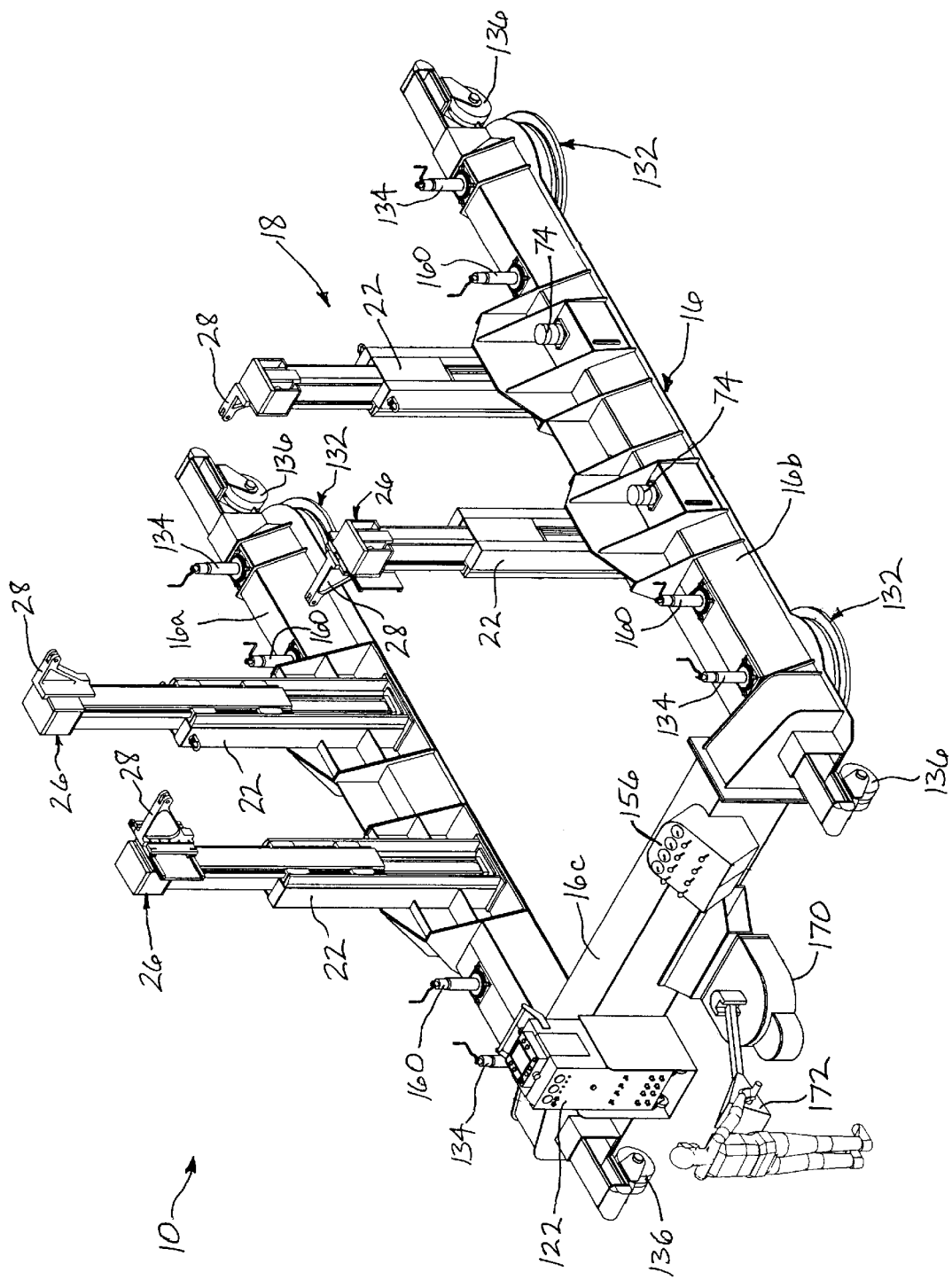
FIG. 1 is a perspective view of an engine uplift loader in accordance with one embodiment of the invention.
Figure 2:
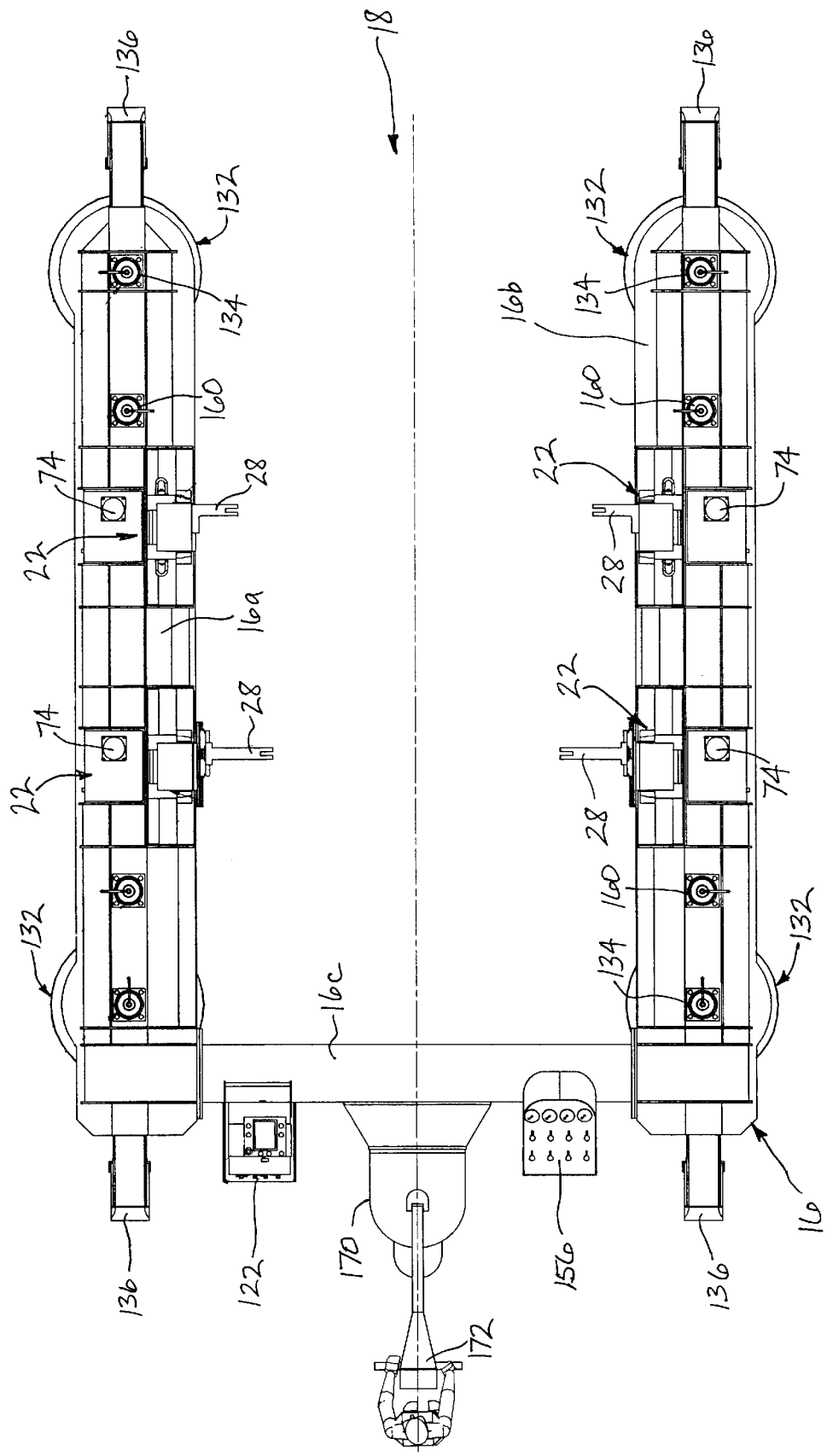
FIG. 2 is a top elevation of the engine uplift loader of FIG. 1.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1 through 4 show a loader 10 according to one embodiment of the invention for lifting an aircraft engine shipping cradle 12 upward along with an aircraft engine 14 supported in the cradle. The loader includes a "U"-shaped frame assembly 16 formed by first and second frame members 16a and 16b that are spaced apart and parallel, and a third frame member 16c that extends between the first and second frame members perpendicular thereto. The frame assembly thus defines an opening 18 between the free ends of the frame members 16a, b for receiving the aircraft engine shipping cradle 12 and a dolly 20 on which the aircraft engine shipping cradle 12 is carried. A plurality of lifting devices 22 are mounted on and extend upwardly from the frame assembly 16. The lifting devices 22 are actuatable to raise the upper ends 26 thereof upwardly relative to the frame assembly. An attachment assembly 28 is attached to the upper end 26 of each of the lifting devices 22. The attachment assemblies 28 are removably attachable directly to the aircraft engine shipping cradle 12 when the cradle is received through the opening 18 of the frame assembly 16. The aircraft engine shipping cradle 12 is raised in response to actuation of the lifting devices 22, such that when the aircraft engine 14 is contained within the aircraft engine shipping cradle 12 the aircraft engine 14 is lifted without having been removed from the aircraft shipping cradle 12.

According to one aspect of the invention, the loader 10 can lift different types of aircraft engines 14. Representative aircraft engines 14 that may be lifted with the loader 10, given by way of non-limiting example, include engines used on Boeing 777 series airplanes, such as the General Electric GE90 Engine (shown in FIGS. 3 and 4), the Pratt & Whitney 4084 through 4098 series of engines, and the Rolls Royce Trent 800 series of engines. The weight of the aircraft engines 14, given by way of non-limiting example, may range from approximately 15,500 pounds to approximately 20,000 pounds. It will be appreciated that the examples of aircraft engines 14 are not intended to limit the scope of the invention, but are given by way of non-limiting example. A person skilled in the art will appreciate that loaders known in the art have been unable to accommodate aircraft engines 14 that differ in weight and other physical characteristics as do the examples of the aircraft engines 14 given above.

The cradles and dollies for these various types of engines differ from one another in construction, as known in the art. Details of their construction, as well as structural differences between the different representative cradles and dollies, are not necessary for an understanding of the invention. These representative engines and dollies are mentioned only for illustrative purposes, and it will be appreciated that the principles of the invention can be applied to construct a loader capable of lifting other types of engines.

In the present description, references to "forward" and "aft" in connection with the engine uplift loader 10 are relative to the fore and aft directions of the engine 14. The engine 14 is received between the frame members 16a, b with the longitudinal axis of the engine generally parallel to the axes of the frame members 16a, b and with the aft end of the engine toward the cross frame member 16c. Thus, the free ends of the frame members 16a, b are referred to as the forward ends and the opposite ends that connect to the cross frame member 16c are referred to as the aft ends. However, these terms are not to be construed as limiting in any way, but are merely used for convenience and clarity of description of the particular embodiment shown in the figures.

The frame member 16a supports a pair of the lifting devices 22 spaced apart along the length thereof, and the other frame member 16b likewise supports a pair of spaced-apart lifting devices 22. FIG. 5 shows one of the forward lifting devices located closer to the forward end of its supporting frame member. The forward lifting devices on the two frame members 16a, b are similar in construction, and the following description applies to both. The forward lifting device includes a base 30 that is rigidly affixed to the supporting frame member. A pair of spaced, parallel rails 32 extend upwardly from the base 30. A hydraulic cylinder 34 is mounted at the base 30 and extends upwardly between the rails 32. A telescoping column 36 is slidably received between the rails 32 and is engaged by the hydraulic cylinder 34 such that extension of the cylinder 34 causes the column 36 to be extended upwardly. The upper end of the column 36 has a clevis 38 mounted thereby which defines the upper end 26 of the lifting device 22. An attachment fitting 28 is mounted to the clevis 38. In the illustrated embodiment, the attachment fitting 28 for each forward lifting device is directly and immovably mounted to the clevis 38.

In this embodiment, the aft lifting devices 22 located closer to the aft ends of the frame members 16a, b include a slide assembly 40 mounted directly to the clevis 38. The slide assembly 40 includes a rail assembly 42 fixedly mounted on the clevis 38 and defining a pair of spaced, parallel horizontal rails 44 that extend generally in a fore-to-aft direction of the loader. A carriage 46 is slidably mounted on the rails 44 and the attachment fitting 28 is mounted on the carriage 46. Thus, the attachment fitting 28 can be moved toward the forward end or the aft end of the respective frame member 16a or 16b, as desired, to permit attachment of the lifting devices 22 to cradles 12 of different sizes. This in turn permits the loader 10 of the invention to load multiple types of aircraft engines 14 of different sizes having differently sized cradles. However, it will be appreciated that the slide assemblies 40 are not necessary if the loader 10 is to be used to load aircraft engines 14 of only one type without removing the aircraft engine 14 from its shipping cradle 12. Accordingly, it is within the scope of the invention to have all the attachment fittings 28 mounted directly and immovably to the devises 38.

All of the hydraulic cylinders 34 preferably have equalized bores, strokes, and sizes. This results in all the hydraulic cylinders 34, and therefore the lifting devices 22, extending upwardly at equalized velocities. Thus, the aircraft engine 14 is lifted in a uniform manner.

Figure 3:
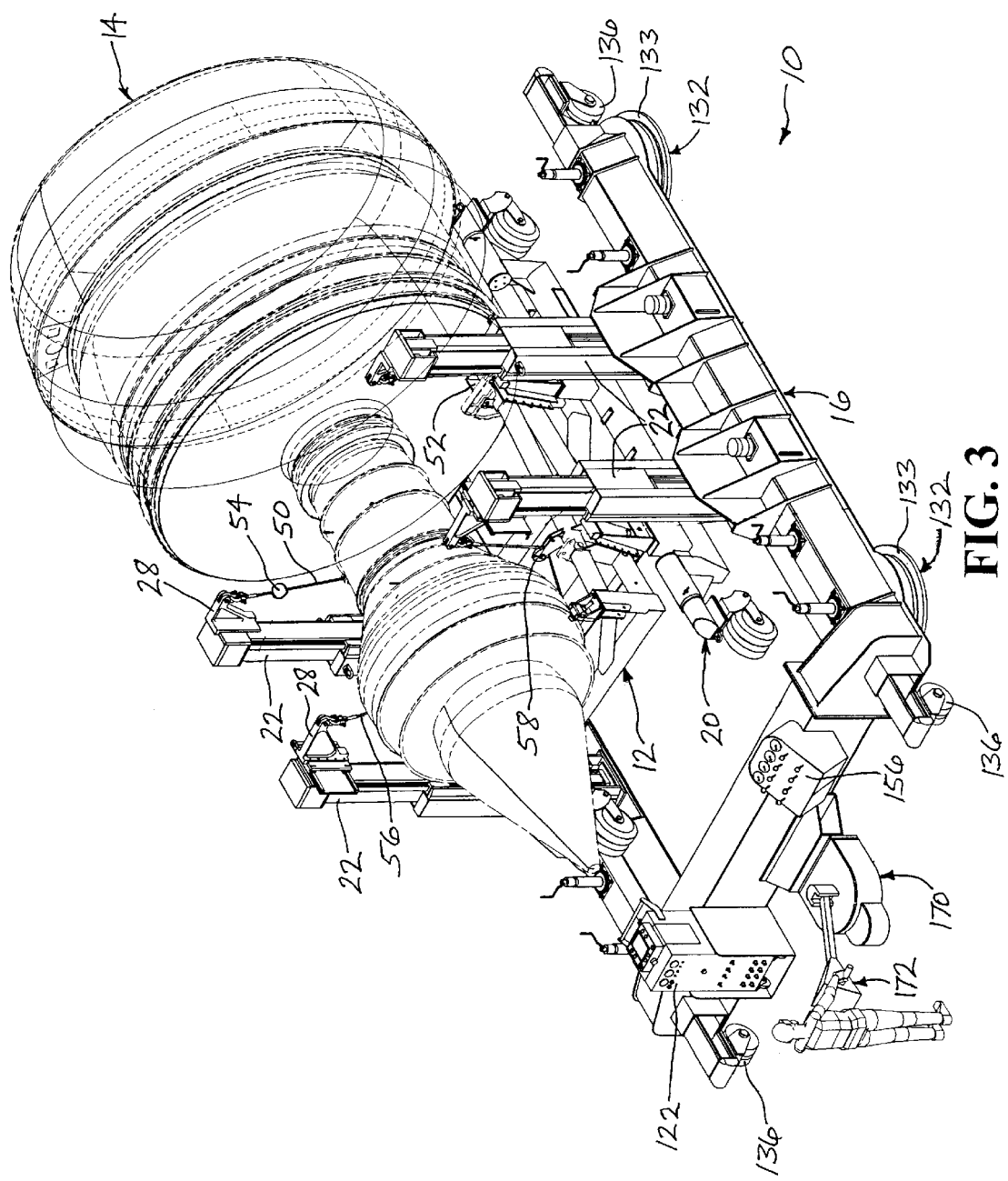
FIG. 3 is a perspective view of the engine uplift loader lifting an engine in its shipping cradle.
Figure 4:
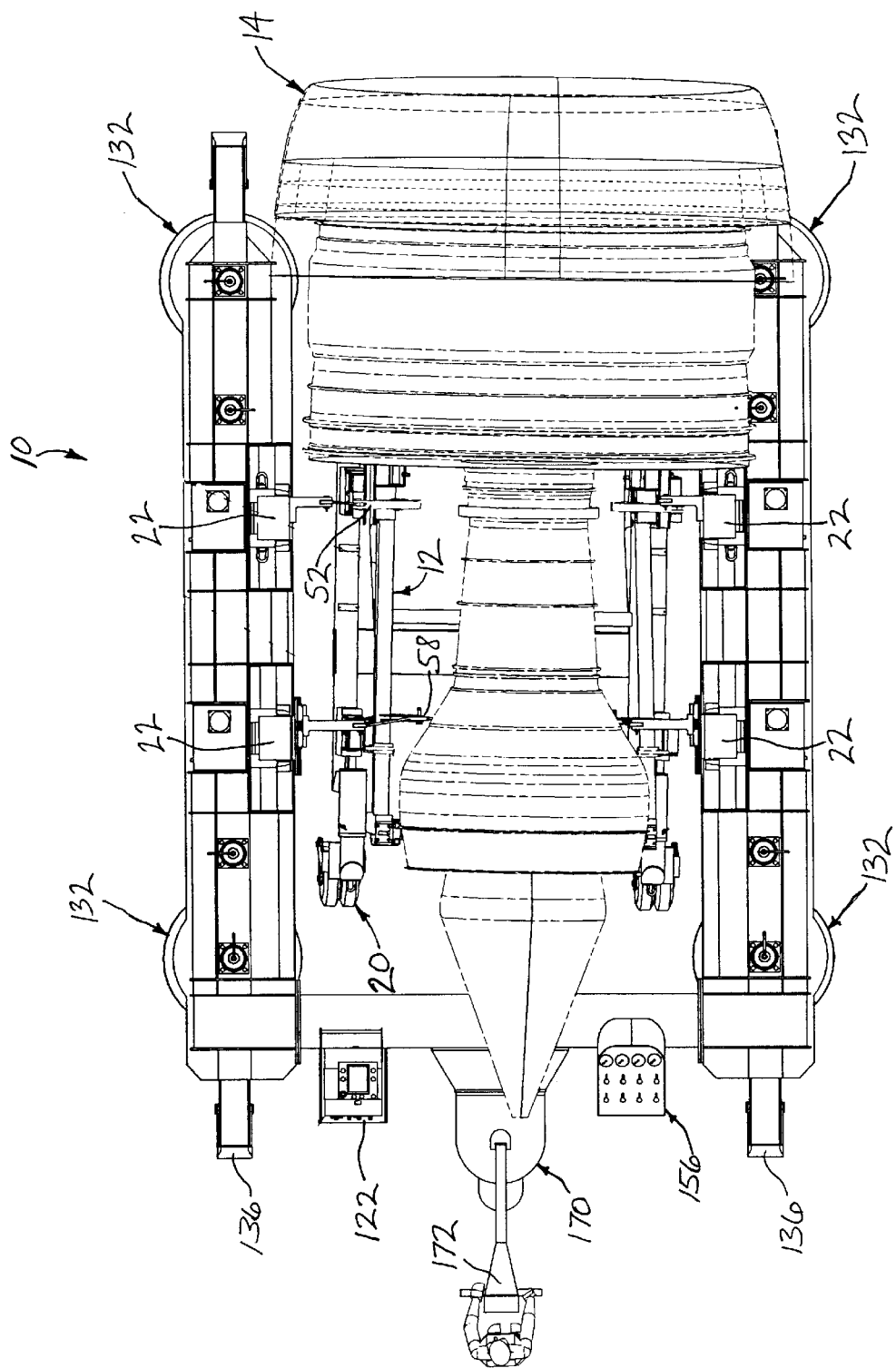
FIG. 4 is a top elevation of the engine uplift loader lifting an engine in its shipping cradle.

Referring now to FIG. 3, a cable 50 is removably attached at one end to each of the attachment fittings 28 of the forward lifting devices 22. The opposite end of each cable 50 is removably attached to a lift fitting 52 (only one visible in FIG. 3) affixed to each of the opposite sides of the cradle 12. If desired, each cable 50 may include a load monitoring device 54. A suitable non-limiting example of the load monitoring device 54 comprises a strain gage, such as a Strainsert™ shackle load pin as disclosed in U.S. Pat. No. 3,695,096. Another suitable load monitoring device 54 comprises a dynamometer. The load monitoring devices 54 are well known in the art, and details of their construction and operation are not necessary for an understanding of the invention. The cables 50 that are attached to the forward lifting devices 22 located toward the forward end of the engine to generally bear a majority (e.g., about 80 percent) of the weight of the engine, cradle, and dolly.

An equalizing cable 56 is removably attached at each of its opposite ends to the attachment fittings 28 on the aft lifting devices 22 located toward the aft end of the engine. The equalizing cable 56 extends beneath the engine 14 and engages sheaves 58 (only one visible in FIG. 3) affixed to each of the opposite sides of the cradle 12. The equalizing cable 56 and sheaves 58 allow the engine 14 in its cradle 12 to roll about the engine axis so that the radial orientation of the engine 14 can be varied as needed during the installation of the engine on the aircraft. More particularly, varying the radial orientation of the engine 14 is desirable to radially align the engine 14 with the engine mounting structure on the aircraft. In most aircraft having wing-mounted engines, the aircraft wing supports a strut that extends downward from the wing, and the engine is mounted onto the lower end of the strut. Typically, a plurality of dowel pins are provided on the strut to support shear loads between the engine and strut. The dowel pins extend downward in a direction generally perpendicular to the wing surface. Thus, when the wing has dihedral, the dowel pins do not extend downward in a purely vertical direction, but rather are angled downwardly and outwardly several degrees toward the wing tip. Accordingly, the holes in the engine mounts on the engine that receive the dowel pins must be properly aligned with the dowel pins when lifting the engine up to engage the strut. This necessitates rolling the engine about its longitudinal axis by several degrees. The equalizing cable 56 and sheaves 58 allow this maneuver of the engine to be accomplished by extending the lifting devices 22 on one side of the engine to a greater height than on the other side of the engine.

Figure 8:
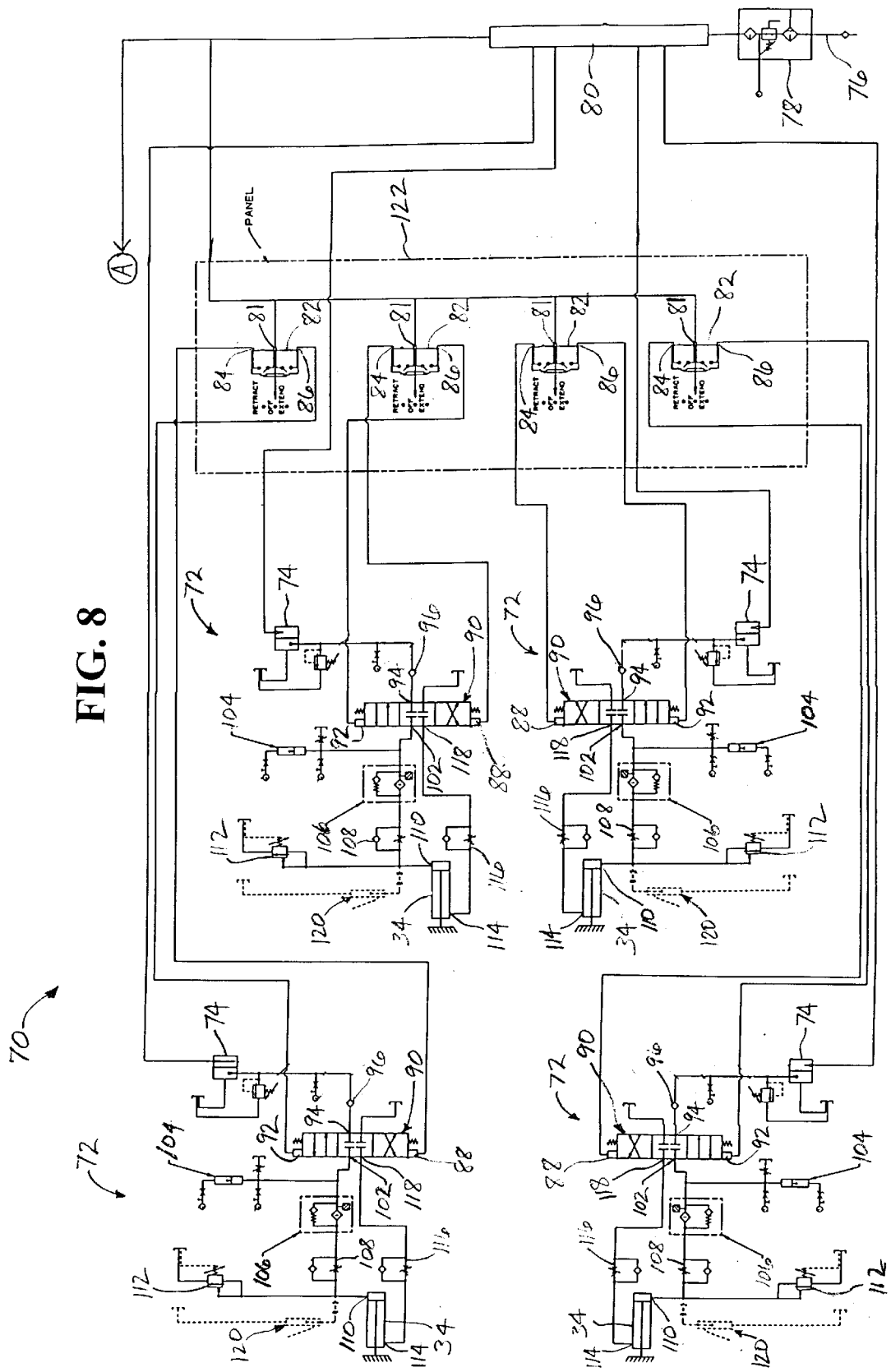
FIG. 8 is a schematic diagram of a hydraulic system for the engine uplift loader.

Referring now to FIG. 8, the loader 10 of the invention includes a hydraulic system 70. In a present embodiment, the hydraulic system 70 includes four hydraulic subsystems 72 that are all substantially identical. This feature reduces complexity in design of the hydraulic system 70, and also contributes to equalizing speed of lifting performed by all the lifting devices 22. In a present embodiment of the invention, each hydraulic subsystem 72 is an air-over-oil-system that includes an air-driven reciprocating pump 74. A suitable non-limiting example of the pump 74 is a HEYPAC model no. GX10 that provides for a 10:1 ratio of fluid pressure to air pressure, with approximately 1,000 psig maximum fluid pressure and approximately 5.3 gpm maximum intermittent flow rate.

Air is supplied from a low pressure (e.g., 65 to 110 psig) service air supply 76 to a filter-regulator 78. Low pressure service air is supplied from the filter-regulator 78 to a manifold 80, and from the manifold 80 to each of the pumps 74. As will be described below, air is also supplied from the manifold 80 to a pneumatic system (shown in FIG. 9) of the loader, as indicated at A in FIG. 8.

Low pressure service air is also supplied from the manifold 80 to an inlet port 81 of a control valve 82 for each hydraulic subsystem 72. The control valve 82 preferably has three positions: retract; off; and extend. The control valve 82 includes a first outlet port 84 and a second outlet port 86. When the control valve 82 is positioned in the "off" position, the inlet port 81 is disconnected from the first and second outlet ports 84 and 86. When the control valve 82 is positioned in the "retract" position the inlet port 81 is placed in fluid communication with the first outlet port 84. When the control valve 82 is positioned in the "extend" position, the inlet port 81 is placed in fluid communication with the second outlet port 86. The first outlet port 84 is connected to a first control port 88 of an air-operated control valve 90, shown as a spool-and-sleeve valve. The second outlet port 86 is connected to a second control port 92 of the air-operated control valve 90.

The outlet of the hydraulic pump 74 is connected to a first inlet port 94 of the control valve 90 via a check valve 96. A first outlet port 102 of the control valve 90 is connected to an accumulator 104 and a regulator 106. The regulator 106 is connected to a flow control valve 108, which is in turn connected to a first port 110 of the hydraulic cylinder 34. The flow control valve 108 is also connected to a pressure relief valve 112. A second port 114 of the hydraulic cylinder 34 is connected to a flow control valve 116, which in turn is connected to a second outlet port 118 of the control valve 90.

An optional hydraulic hand pump 120 (shown in phantom) may be provided for each of the hydraulic subsystems 72, if desired, to permit operation of each of the lifting devices 22 in the event of failure of the associated pump 74. The hand pump 120 can be connected to the first port 110 of the hydraulic cylinder 34. A suitable example of the hand pump 120 is the SIMPLEX Model 1000-4.

The control valves 82 for the lifting devices 22 preferably are mounted in a control cabinet 122 located on the frame assembly of the loader 10 proximate the aft end of the loader as shown in FIGS. 1–4. The control cabinet 122 is connected to a control pendant that includes a visual display for information received from various components of the control system. The control cabinet 122 includes a microprocessor and also includes a power supply and rechargeable batteries, an emergency stop button, lead connections for the leads from the load monitoring devices 54, a connection for an umbilical attached to the control pendant, and quick connect couplings for pneumatic hoses that supply the air-operated motors for the hydraulic cylinders. The control pendant also includes a microprocessor that allows an operator to log on with a password and select the desired engine configuration from a list of available engine configurations for each of which there are certain data stored in memory, including the load and preload conditions. The control pendant displays the load measured by the load monitoring devices 54 on the lifting mechanisms 22 and also displays maximum allowable loads for the four lifting mechanisms. The control pendant also has control buttons for controlling various functions of the uplift loader.

To extend the hydraulic cylinders 34 for lifting an engine, the control valve 82 for each lifting device is placed in the "extend" position, which causes low pressure air to be supplied from the second outlet port 86 of the control valve to the second control port 92 of the air-operated control valve 90. The air supplied to the second control port 92 causes the control valve 90 to be moved so as to couple the inlet port 94 of the control valve 90 with the first outlet port 102 of the control valve 90. Thus, pressurized hydraulic fluid from the pump 74 is supplied through the regulator 106 and flow control valve 108 to the first port 110 of the hydraulic cylinder 34, causing the cylinder to be extended. If the hydraulic pressure in the cylinder 34 exceeds a predetermined level, which would typically be due to an abnormal condition causing an overload (e.g., binding between the loader and aircraft), the relief valve 112 opens to prevent further extension of the cylinder. Additionally, in the unlikely but possible event that the aircraft should unexpectedly drop down lower than its normal parked position, the relief valves 112 allow the cylinders to be forcibly shortened by the descending aircraft without damaging the loader. The relief valves thereby ensure that the forces exerted between the loader and the aircraft do not exceed a predetermined maximum value. The relief valves 112 preferably are adjustable to allow the opening pressure of the valves to be adjusted to a desired value. Thus, the loader is self-relieving to prevent damage to the loader and/or the aircraft from abnormally large forces that could arise therebetween from various causes.

To retract the hydraulic cylinders 34, the control valves 82 are placed in the "retract" position, which couples the first outlets 84 of the control valves 82 to the first control ports 88 of the air-operated control valves 90, thereby moving the control valves 90 so as to couple the inlets 94 of the control valves 90 with the second outlets 118 thereof. This causes pressurized hydraulic fluid from the pumps 74 to be supplied through the flow control valves 116 to the second ports 114 of the cylinders 34, thereby retracting the cylinders. Fluid expelled from the first ports 110 of the cylinders 34 during retraction is accumulated in the accumulators 104.

Figure 9:
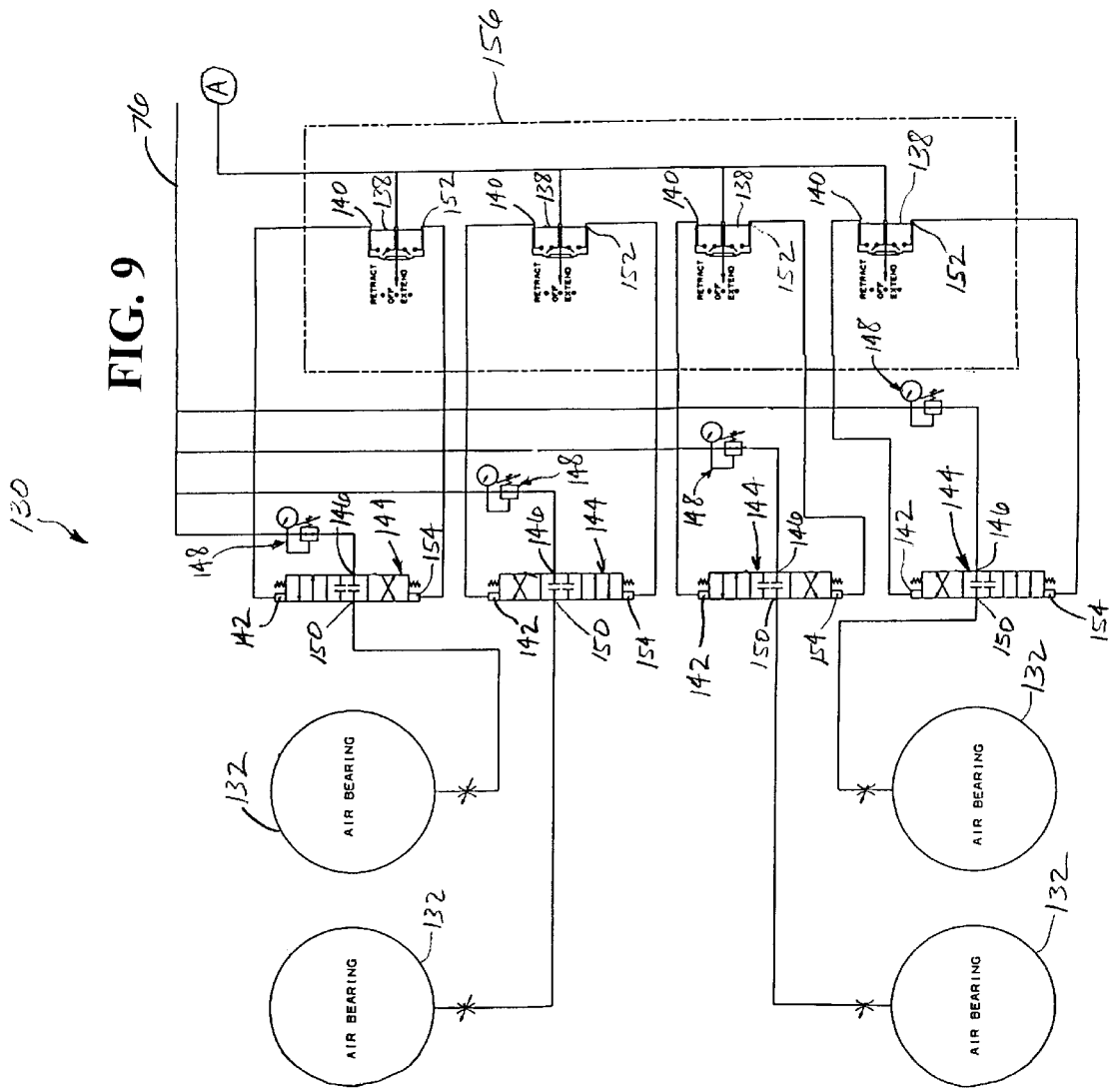
FIG. 9 is a schematic diagram of a pneumatic system for the engine uplift loader.

The engine uplift loader 10 also includes a pneumatic system 130 as depicted in FIG. 9. The pneumatic system includes four air bearings 132, two of the air bearings being mounted to each of the frame members 16a and 16b as shown in FIGS. 1–4. The air bearings 132 are mounted to the frame members via jacking devices 134 (FIG. 1) so as to be extendable and retractable in a vertical direction. In the illustrated embodiment, the jacking devices 134 comprise manually operable jacks, but alternatively the jacking devices could be electrically, hydraulically, or pneumatically operated devices. When the air bearings 132 are fully retracted upwardly, the engine uplift loader is supported on four caster wheels 136 mounted to the frame assembly as shown in FIGS. 1–4. By operating the jacking devices 134 to extend the air bearings 132 downwardly into engagement with the supporting surface (e.g., the floor of an aircraft assembly building), the engine uplift loader 10 can be lifted off the wheels 136 so that it is supported by the air bearings 132.

The air bearings 132 are operable to create a thin film of air between the supporting surface and the lower surfaces of the air bearings such that the entire weight of the loader 10 and its cargo is supported on the film. This allows the loader 10 to be moved along the supporting surface with very little force. A non-limiting example of an air bearing suitable for the present invention is Model No. 36S-20 air bearing from Air Film Corporation of Seattle, Wash., which is a 36-inch diameter air bearing that operates with 25 psig supply air to create a 788 square-inch effective lift area and has a rated capacity of 20,000 pounds. However, it will be understood that the performance characteristics and design of the air bearings may vary depending on the intended use of the loader. The air bearings are used for maneuvering the loader 10 during installation or removal of an engine so that proper alignment between the engine and the aircraft or between the loader and the engine can be achieved. Preferably, the air bearings include shoes 33 (FIG. 1) of steel or the like that are magnetically attached to the air bearings. This is accomplished by replacing the center landing pad of the air bearing with a magnet, to which the shoes are attached. The shoes 133 protect the air bearings from irregular or rough surfaces so that the loader can be operated on various types of surfaces including smooth floors, rough floors, flight lines, or in an aircraft-on-ground (AOG) situation.

The pneumatic system 130 also includes a three-position control valve 138 coupled to each of the air bearings 132. Each control valve 138 has its inlet port connected to the manifold 80 (FIG. 8). A first outlet port 140 of each control valve 138 is connected to a first control port 142 of a control valve 144. The control valve 144 has an inlet 146 connected to the air supply 76 via a regulator 148. An outlet 150 of each control valve 144 is connected to the respective air bearing 132. A second outlet port 152 of each control valve 138 is connected to a second control port 154 of the respective control valve 144. Each control valve 138 has three positions designated "retract", "off", and "extend", although only the "retract" and "off" positions are used in the present embodiment. When the control valve 138 is placed in the "off" position, no control air is supplied from the control valve 138 to either of the control ports 142, 154 of the respective control valve 144, and thus the control valve 144 is in its normal closed position so that the supply air is not provided to the associated air bearing 132. When the control valve 138 is placed in the "retract" position, control air is supplied from the first outlet 140 of the control valve 138 to the first control port 142 of the respective control valve 144, which causes the valve 144 to be moved so as to couple the inlet 146 with the outlet 150, thereby supplying air to the associated air bearing 132. The control valves 138 preferably are mounted on a secondary control panel 156 located on the frame assembly of the loader 10 proximate the aft end thereof, as shown in FIGS. 1–4.

The loader 10 also preferably includes a plurality of jacks 160 (FIGS. 1 and 2) mounted on the frame assembly. As explained further below, the jacks 160 are used for maintaining a preload between the engine and the aircraft during installation and removal of the engine. The jacks 160 in the illustrated embodiment are manually operated, but alternatively could be electrically, hydraulically, or pneumatically operated.

The procedure for installing an engine on an aircraft using the loader 10 is now described. With the engine 14 supported in the cradle 12 and dolly 20 on a supporting surface, the loader 10 is moved into position so that the engine/cradle/dolly is between the frame members 16a and 16b. Generally, this movement of the loader 10 is accomplished by rolling the loader along the supporting surface on the caster wheels 136. The loader preferably includes a powered drive unit 170 that is operable to move the loader along the supporting surface on the wheels 136. The drive unit can be powered electrically, hydraulically, or pneumatically. The drive unit 170 includes an operator interface 172 that an operator can use to control the drive unit 170. A suitable drive unit 170 can be obtained, for example, from Aero-Go, Inc., of Seattle, Wash. Once the loader is positioned around the engine/cradle/dolly, the forward cables 50 are attached between the cradle 12 and the forward attachment fittings 28, and the aft equalizing cable 56 is attached to the aft attachment fittings 28 and to the cradle 12. The loader is moved to position the engine beneath the strut on the aircraft approximately in alignment with the dowel pins on the strut. If required or desired, plumb bobs can be suspended from the dowel pins to assist in aligning the engine mounts with the dowel pins. Once the engine is approximately positioned in alignment with the strut and dowel pins, the lifting devices 22 are operated to lift the engine/cradle/dolly about 18 inches to balance the load under the strut, and then the engine/cradle/dolly is lowered back down and the dolly 20 is removed from the cradle 12. The loader then lifts the engine and cradle back up until the dowel pins are just about to engage the engine mounts on the engine. The aft and forward engine mount stabilizers (not shown) are removed, and the jacking devices 134 are operated to lower the air bearings 132 to the supporting surface. The air bearings 132 are activated to float the loader on a film of air. The lifting devices 22 are then used to lift the engine upward to engage the dowel pins in the engine mounts. During this process, the loader can be readily maneuvered on the film of air to ensure proper alignment between the dowel pins and engine mounts so that binding therebetween can be avoided. If necessary, adjustments to the strut and/or engine mounts can be made. Once the dowel pins are engaged in the engine mounts, the jacks 160 are lowered to the supporting surface and the air bearings are deactivated. The jacks 160 are operated so as to maintain a desired preload between the engine and the strut. The load monitoring devices 54 are used for measuring the amount of preload existing between the engine and the strut. Once the desired preload is attained, threaded fasteners are used to affix the engine to the strut as known in the art. The cradle is then disconnected from the engine and the lifting devices 22 are retracted to lower the cradle away from the engine.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An engine uplift loader for lifting and positioning an aircraft engine while still in a shipping cradle in which the engine is supported so that the engine can be attached to engine mounting structure on an aircraft, the engine uplift loader comprising:

a frame assembly having generally parallel first and second frame members spaced apart by a distance enabling the shipping cradle and engine to be positioned between the first and second frame members;

first and second lifting devices spaced apart along and supported on each of the frame members and extending upwardly therefrom, each lifting device being operable to raise and lower an upper end of the lifting device relative to the frame assembly along a generally vertical lifting axis; and an attachment assembly mounted to the upper end of each lifting device, each attachment assembly being structured and arranged to attach to the shipping cradle such that raising the upper ends of the lifting devices causes the shipping cradle and engine to be lifted upwardly, at least one of the first and second attachment assemblies for each of the frame members having a movable mount such that said attachment assembly can be selectively positioned in various positions to permit a distance between the first and second attachment assemblies on the lifting devices on each frame member to be varied.

2. The engine uplift loader of claim 1, wherein each movable mount comprises a slide assembly structured and arranged to permit the attachment assembly to be slid along a horizontal axis.

3. The engine uplift loader of claim 1, further comprising a load monitoring device for monitoring the load exerted on the engine and shipping cradle by the engine uplift loader.

4. The engine uplift loader of claim 1, further comprising a plurality of fluid cushion bearings mounted on the frame assembly and operable to lift the engine uplift loader off a supporting surface and support the engine uplift loader on a fluid film so as to enable the engine uplift loader to be maneuvered for aligning the engine with the engine mounting structure on the aircraft.

5. The engine uplift loader of claim 4, further comprising a plurality of wheels attached to the frame assembly for transporting the engine uplift loader along the supporting surface, and wherein the fluid cushion bearings are vertically extendable for engaging the supporting surface to lift the engine uplift loader off the wheels and are retractable for disengaging the supporting surface.

6. An engine uplift loader for lifting and positioning an aircraft engine while still in a shipping cradle in which the engine is supported so that the engine can be attached to engine mounting structure on an aircraft, the engine uplift loader comprising:

a generally U-shaped frame assembly having spaced, generally parallel first and second frame members each having a first end and a second end, and a third frame member extending between the first ends of the first and second frame members, the frame assembly defining an opening between the second ends of the first and second frame members through which the engine on the shipping cradle can be received such that the engine and shipping cradle are disposed between the first and second frame members;

each of the first and second frame members supporting a first lifting device and a second lifting device spaced apart along a length of said frame member, each lifting device being operable to raise and lower an upper end of the lifting device along a generally vertical lifting axis;

an attachment assembly mounted to the upper end of each lifting device, each attachment assembly being structured and arranged to attach to the shipping cradle such that raising the upper ends of the lifting devices causes the shipping cradle and engine to be lifted upwardly, and wherein the attachment assembly of one of the first and second lifting devices on each frame member includes a movable mount for the attachment assembly, wherein each movable mount comprises a slide assembly structured and arranged to permit the attachment assembly to be slid along a horizontal axis; and a plurality of jacks attached to the frame assembly and operable to be extended in engagement with the supporting surface to urge the engine uplift loader upwardly for applying a preload between the engine and the engine mounting structure on the aircraft.

7. The engine uplift loader of claim 6, further comprising a plurality of fluid cushion bearings mounted on the frame assembly and operable to lift the engine uplift loader off a supporting surface and support the engine uplift loader on a fluid film so as to enable the engine uplift loader to be maneuvered for aligning the engine with the engine mounting structure on the aircraft.

8. The engine uplift loader of claim 7, further comprising a plurality of wheels attached to the frame assembly for transporting the engine uplift loader along the supporting surface, and wherein the fluid cushion bearings are vertically extendable for engaging the supporting surface to lift the engine uplift loader off the wheels and are retractable for disengaging the supporting surface.

9. The engine uplift loader of claim 6, further comprising wheels mounted on the frame assembly and a powered drive unit operable to move the engine uplift loader along a supporting surface on the wheels.

* * * * *